United States Patent [19]
Sheline

[11] Patent Number: 5,864,933
[45] Date of Patent: Feb. 2, 1999

[54] FLEXIBLE MOLDING APPLICATION TOOL

[75] Inventor: Cheryl A. Sheline, Napoleon, Ohio

[73] Assignee: Cooper Tire & Rubber Company, Findlay, Ohio

[21] Appl. No.: 823,317

[22] Filed: Mar. 21, 1997

[51] Int. Cl.$^6$ .................................................. B25B 27/00
[52] U.S. Cl. ....................................... 29/243.58; 29/243.5
[58] Field of Search ............................. 29/243.5, 243.57, 29/243.58, 453, 451, 450, 514, 525

[56]  References Cited

U.S. PATENT DOCUMENTS

| | | |
|---|---|---|
| 2,725,089 | 11/1955 | Gerard . |
| 3,797,430 | 3/1974 | Boudreau ............................... 29/243.58 |
| 5,115,551 | 5/1992 | Goedderz et al. .................... 29/243.58 |

FOREIGN PATENT DOCUMENTS

| | | |
|---|---|---|
| 0 631 852 A | 1/1995 | European Pat. Off. . |
| 2 237 836 | 5/1991 | United Kingdom . |

*Primary Examiner*—Robert C. Watson
*Attorney, Agent, or Firm*—Joseph G. Nauman

[57]  ABSTRACT

An improved tool for, and a method of, crimping weatherstrips in an essentially continuous motion along the in-place weatherstrip, e.g. about a door flange or the like. the head is provided with a handle extending from the top therefrom at a convenient angle to allow an operator to assume a position alongside the door flange. The handle, or at least the grip thereof, is capable of swiveling about the longitudinal axis of the handle, to reduce stress on the hands, wrists, and arms of an operator by permitting guiding motion of the tool ahead around the door flange while minimizing the amount of turning of arms or hands, or re-positioning of the operator's body, as the tool is caused to progress entirely along the length of the weatherstrip. This length is often the entire perimeter of the door opening. In using this improved tool to perform the crimping operation, the operator can move his/her arm in a generally circular motion, causing the tool head to follow the door opening flange, while the swivel handle accommodates the changes in angle as this motion proceeds. Another feature of the invention is the provision of a spring-loaded crimping roller pivotally mounted on the tool head, in opposition to a fixed crimping roller. Preferably, both crimping rollers are power driven. This allows the axes of the crimping rollers, and the spacing between them, to vary as the tool progresses in its action, so as to accommodate changes in thickness of the door opening flange.

6 Claims, 4 Drawing Sheets

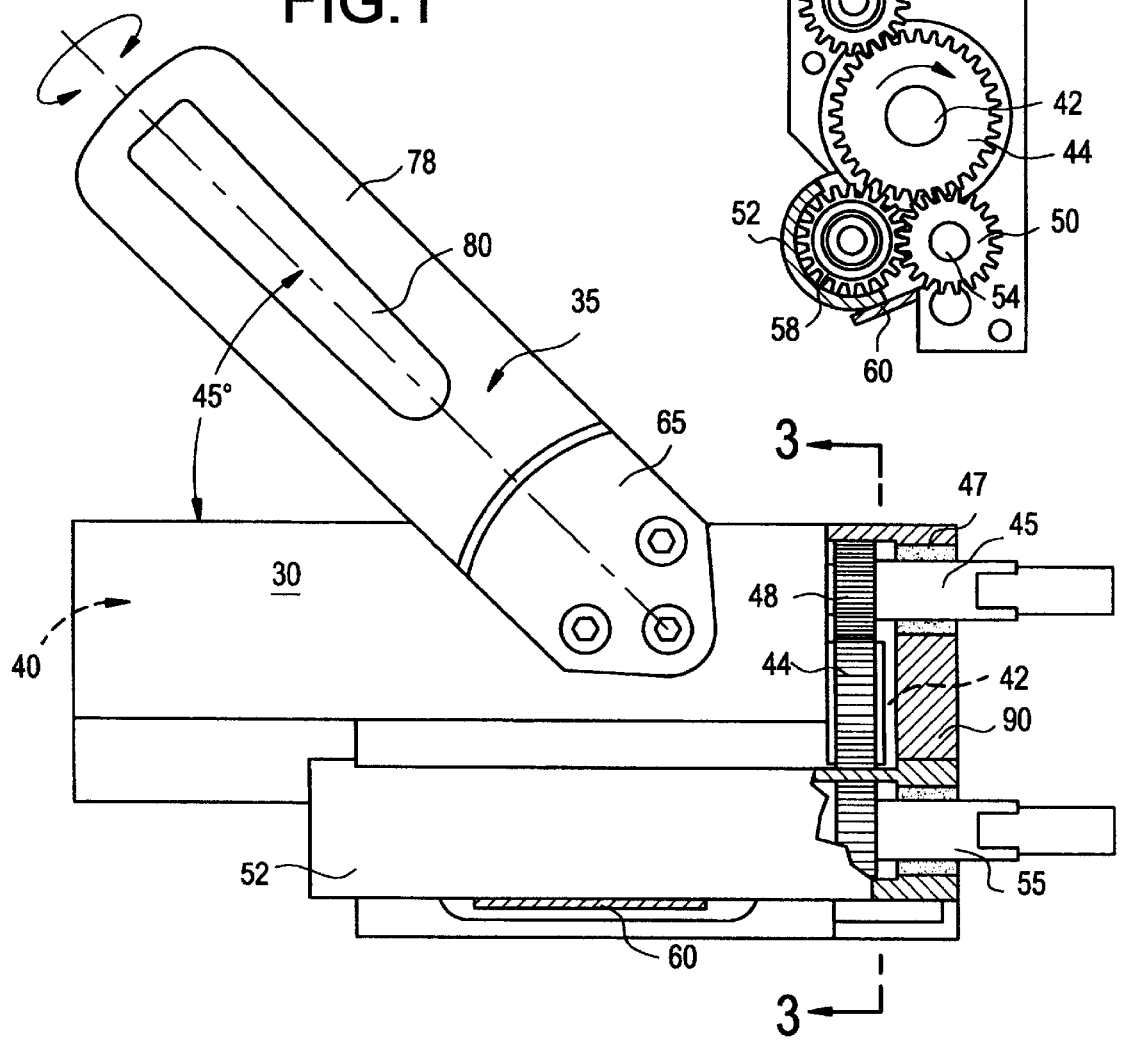
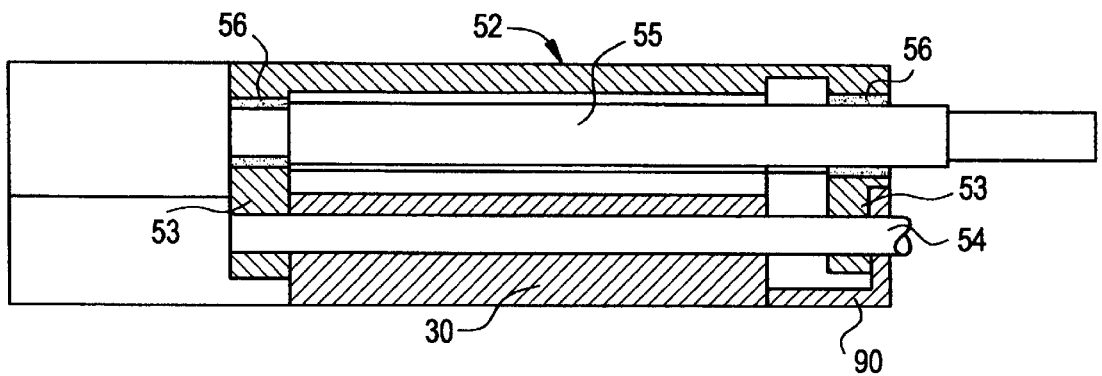

FLEXIBLE MOLDING APPLICATION TOOL

FIELD OF THE INVENTION

This invention relates to an improved tool for applying flexible molding, such as weatherstrip, to the perimeter of an opening, particularly a door opening in a vehicle body, wherein in the tool is easily manipulated to follow irregular and hard to access borders of such openings.

BACKGROUND OF THE INVENTION

There have been problems with the fitting of flange mounted automotive weatherstrips because of the manufacturing tolerances for both the weatherstrip and the vehicle. The flange to which the weatherstrip is fitted can have multiple thicknesses of sheet metal, and if the weatherstrip is pre-formed to accommodate these different thicknesses, it may be too wide for the single layer thicknesses and too narrow for the multiple layer thicknesses. As a result, the weatherstrip may not grip satisfactorily where the flange is of one layer, and if the flange consists of two or more layers, the weatherstrip may be extremely difficult to install in some places, and loose in others.

The weatherstrips have in recent years developed into complex cross-sections. They include the basic U-shaped central section, and optional internal ribs, and an embedded metal carrier which will maintain the shape of the central section. The weatherstrips are supplied to the assembly plant with the central section (and carrier) partially closed. This provides a cross-section with a low insertion effort for easy installation. This central section is applied to the vehicle opening flange by hand, beginning at some convenient index point. Various forms of lips and/or bulb sections may be provided on the exterior walls of the central section. A tool is then used to crimp the central section directly onto the flange.

The weatherstrips are fitted by an assembler in a loosely closed condition onto the opening (door) flanges on an assembly line, then formed by the tool to close the central section against the flanges, thus producing the desired final profile where the weatherstrip is tightly crimped in its functional position. This final forming operation is performed on line in the vehicle assembly plant utilizing a tool of the type disclosed herein. Thus, instead of a final stage of forming (as by rolls) at the end of the strip manufacturer's extrusion, as has been done in the past, and encountering the potential of distortion during packing and shipping, a hand-held roll-forming tool is used to post-form the weatherstrip directly onto the door flange, ensuring perfect sealing characteristics.

Present tools consist of a standard in-line pneumatic motor tool which drives two cylindrical counter-rotating rollers at its forward end. The necessary gears and bearings are housed in a case that is attached to the motor output shaft. The air motor is equipped with an activation lever which controls a valve in the air supply to the motor, to control rotation of the rollers.

The rollers are a predetermined fixed distance apart and revolve in opposite directions (e.g. an inward nip) thus applying pressure on the profile of the central section as these rollers are advanced along the weatherstrip already placed on the door flange. To use these tools correctly, the rollers must be kept in the correct relationship to the weatherstrip and flange during excursion of the tool around the opening. Specifically, the axes of the rollers must be maintained parallel to the flange surface. Also, the angle of the tool head should be kept at a certain inclination (e.g. inclined 5 degrees to 10 degrees towards the direction of travel) to start and maintain proper engagement of the rollers against the weatherstrip. If that inclination is too small or away from the direction of travel, then the tool will tend to move off the weatherstrip. The relatively heavy and off balance tool makes this action difficult and stressful.

SUMMARY OF THE INVENTION

The present invention provides an improved tool for the operation of crimping such weatherstrips and the like in an essentially continuous motion along the in-place weatherstrip, e.g. about a door flange or the like. This tool incorporates an air motor in the tool head, and the head is provided with a handle extending from the top therefrom at a convenient angle to allow an operator to assume a position alongside the door flange. The handle, or at least the grip thereof, is capable of swiveling about the longitudinal axis of the handle, to reduce stress on the hands, wrists, and arms of an operator by permitting guiding motion of the tool head around the door flange while minimizing the amount of turning of arms or hands, or re-positioning of the operator's body, as the tool is caused to progress entirely along the length of the weatherstrip. This length is often the entire perimeter of the door opening. In using this improved tool to perform the crimping operation, the operator can move his/her arm in a generally circular motion, causing the tool head to follow the door opening flange, while the swivel handle accommodates the changes in angle as this motion proceeds.

Another feature of the invention is the provision of a spring-loaded crimping roller pivotally mounted on the tool head, in opposition to a fixed crimping roller. Preferably, both crimping rollers are power driven. This allows the axes of the crimping rollers, and the spacing between them, to vary as the tool progresses in its action, so as to accommodate changes in thickness of the door opening flange.

BRIEF DESCRIPTION OF THE DRAWINGS

FIG. 1 is a top view of the tool with the crimping rollers removed;

FIG. 2 is a side view of the tool showing the pivot mounting structure of the support shaft for the movably mounted roller shaft;

FIG. 3 is a cross-sectional view taken on line 3—3 in FIG. 1;

DESCRIPTION OF THE PREFERRED EMBODIMENT

Figure 10:
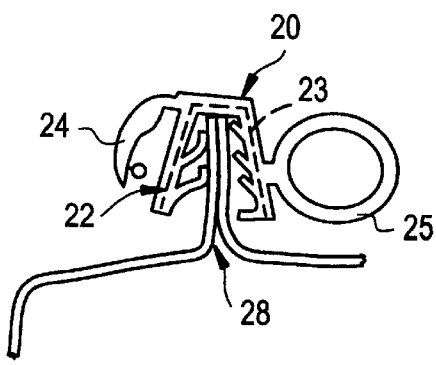
FIG. 10 is a schematic view of a typical weatherstrip placed upon a door flange.
Figure 11:
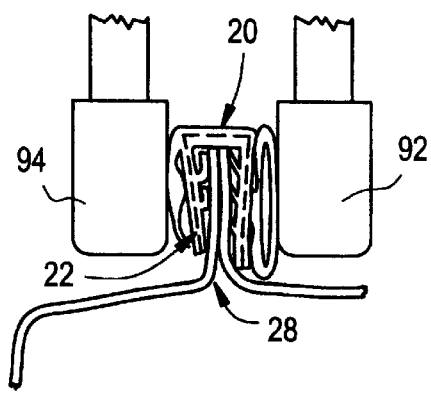
FIG. 11 is a schematic view showing the crimping tool rollers acting on the weatherstrip.
Figure 7:
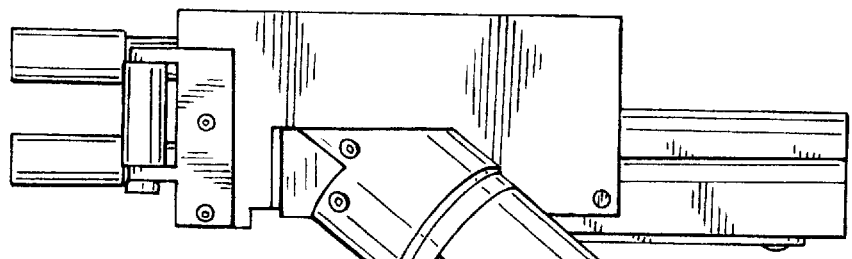
FIG. 7 is a perspective view of the tool.
Figure 8:
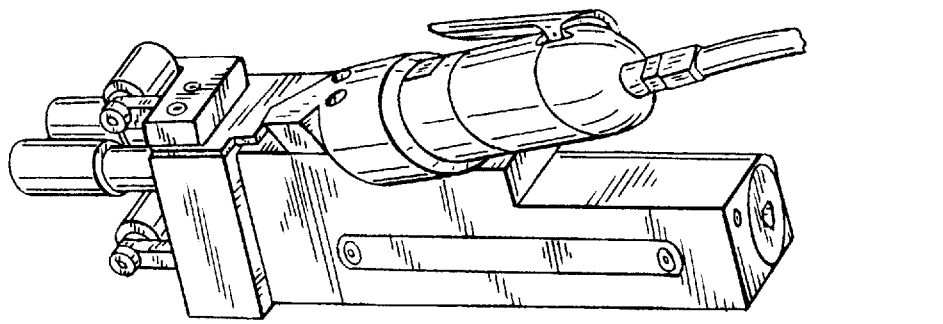
FIG. 8 is a pictorial view showing the tool head beginning to circumnavigate a door opening.
Figure 9:
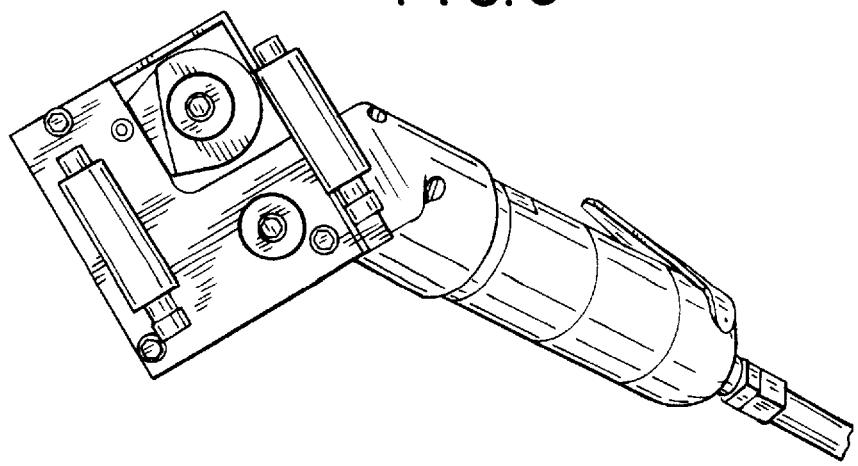
FIG. 9 is a perspective view from one side of the tool, illustrating the function of the guiding rollers.

Referring to the drawings, particularly to FIGS. 10 and 11, a typical modern weatherstrip 20 is shown in cross-section, including an internally ribbed main or central section 22 which incorporates a conventional metal skeleton 23, and also has attached to it a lip portion 24, and a hollow collapsible bulb portion 25; the lip portion and bulb are typical of newer forms, but are not necessary parts in various other configurations of weatherstrip. FIG. 10 shows such a strip placed on a door flange 28, the central section having already been fitted about flange 28 in the act of placing the weatherstrip manually. This action bends the carrier sides initially inward. FIG. 11 illustrates the action of the crimping rollers of the tool, which is described below.

FIG. 1 is a view from the top of the tool, illustrating the overall configuration of main housing 30 and swiveling handle 35. Housing 30 has a top, a front end and rear end, and a first side, and second side. The angular relationship of handle 35 to housing 30 can be seen by comparison of FIGS. 1 and 4. The handle extends upward, outward, and rearward of housing 30, being fastened at an angle to top, near to front end. An air motor 40, preferably of the vane type, is incorporated within housing 30, and has an output shaft 42 to which is fastened the main drive gear 44 (FIG. 3).

A first output drive shaft 45 is supported along a fixed axis by bushings in housing 30, the forward bushing shown at 47, and a first driven gear 48 is fixed to shaft 45, meshing with main drive gear 44 (FIGS. 1 and 3). An idler gear 50, rotatable on the end of a pivot pin 54 in the forward end of housing 30, also meshes with drive gear 44. On the side of housing 30 opposite shaft 42, there is an elongated separate small support block, 52 having supporting ears 53 which are engaged around the pivot pin 54 fitted into housing 30. A second output drive shaft 55 is rotatably supported by bushing 56 in the small housing 52, and a second driven gear 58 is fixed to shaft 55, meshing with idler gear 50. Thus, shafts 45 and 55 are supported in main housing 30, and extend from the front end 32.

A leaf spring 60 is anchored in housing 30 (as by screws, not shown, in its lower edge) proximate to pivot pin 54, and extends upward and outward, as shown in FIG. 3, resting against the separate second housing 52 and urging it into contact with the adjacent side of housing 30. Thus, driven gear 58 can move in an arc about pivot pin 54 while maintaining mesh with idler gear 50. This action allows the parallel centerlines of drive shafts 45 and 55 to be separated while the gears all remain in mesh.

Figure 4:
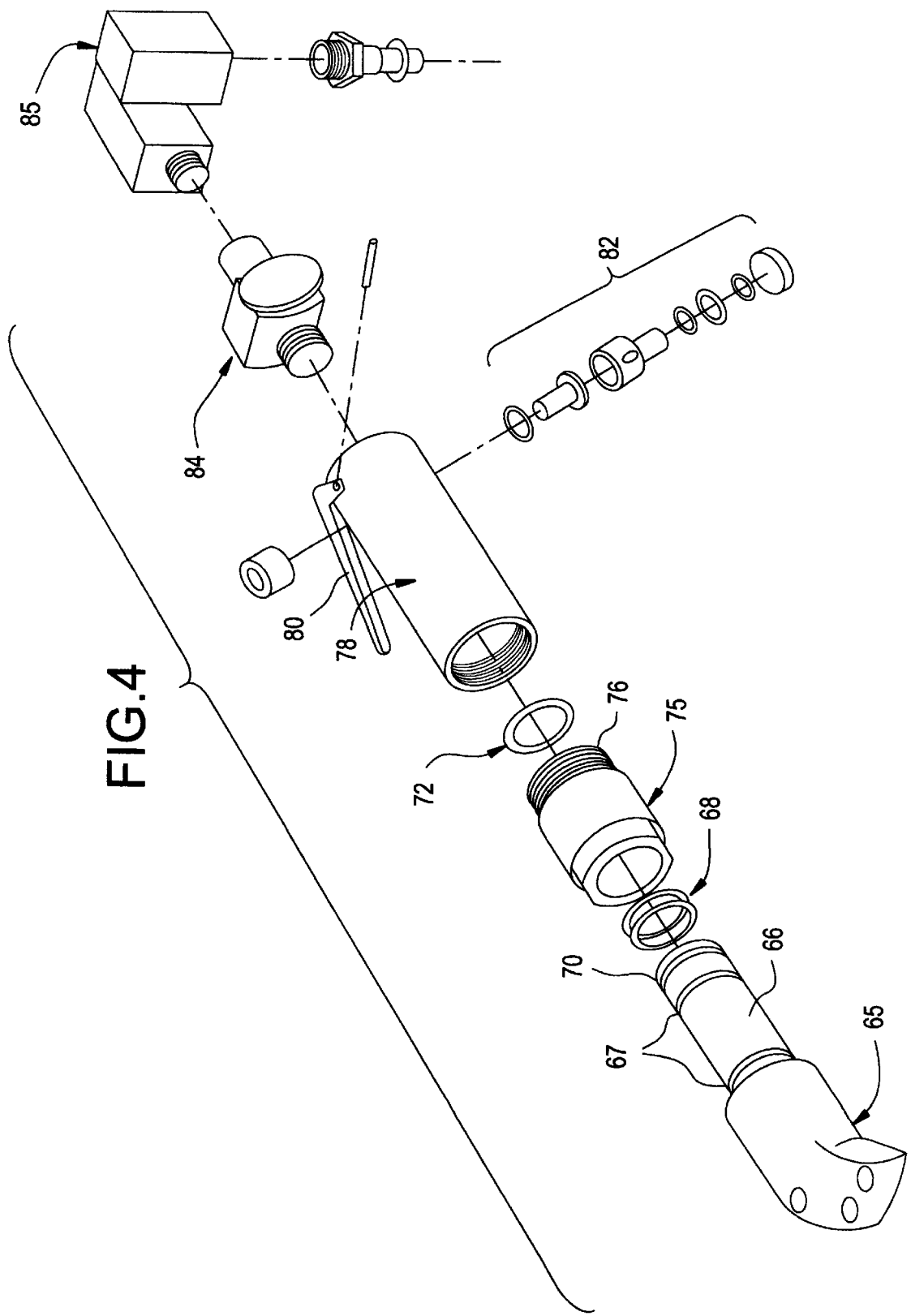
FIG. 4 is a partially exploded perspective view of the swiveling handle.

Referring particularly to FIG. 4, handle 35 includes an angular handle adaptor 65 having an appropriately angled face which is bolted to housing top 31 near to the front-end 32. Adaptor 65 is located on a longitudinal handle axis which is inclined upward and outward toward housing rear end 33, and also outward of the first housing side 34A. The handle adaptor 65 includes a rearwardly extending cylindrical part 66 having a pair of spaced apart circumferential grooves 67 receiving O-ring seals 68, and a snap ring retainer groove 70 into which a retaining snap ring 72 can be fitted. A cylindrical throttle adapter 75 fits over the part 66, is held thereon by snap ring 72, and presents a threaded end 76 to internal threads of the throttle handle assembly 78. The throttle handle assembly is a conventional part, used in various forms in a number of compressed air driven tools.

A control lever 80 is pivotally supported on the outward end of the throttle handle assembly 78, and controls the opening of an air valve 82 of conventional construction, normally spring biased closed, in the throttle handle assembly. Lever 80 is arranged to open valve 82 when the lever is squeezed against the throttle handle assembly. Outward of valve 82 is the fitting for the air supply hose. This fitting contains a metering unit 84 and a standard swiveling air coupling 85. In operation, the fingers of the hand of the operator holding the throttle handle assembly grip over lever 80 so the operator squeezes the lever to start the internal air motor.

Figure 6:
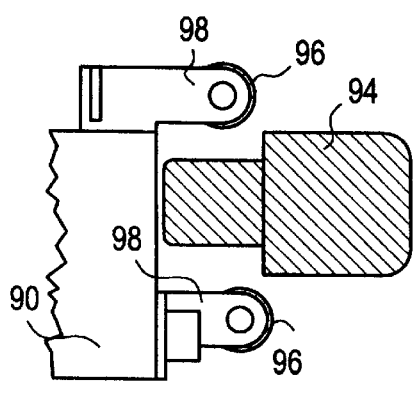
FIG. 6 is a partial side view of the rollers shown in FIG. 5.
Figure 5:
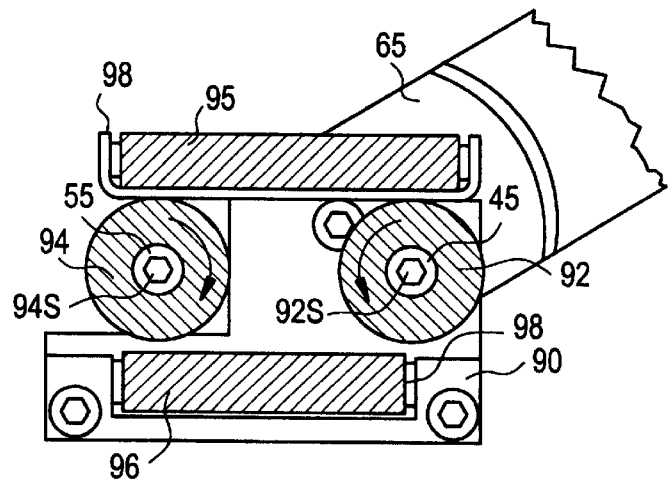
FIG. 5 is an end view of the tool shown in FIG. 1, with the crimping rollers fitted to their respective support and driving shafts.

FIGS. 5 and 6 show the end cap 90 which is attached to the front end 32 of housing 30, covering the gears. The crimping rollers 92 (fixed axis) and 94 (movable axis) are shown fitted to the ends of drive shafts 45 and 55. They are secured on shafts 45, 55 by suitable screws 95S, 96S. A set of guide rollers 95, 96 are supported by brackets 98 above and below the crimping rollers, extending at right angles to drive shafts 45, 55. These guide rollers are freely rotatable and provide a form of depth stop for the insertion of the crimping rollers around a weatherstrip and a low friction guide which helps to maintain the tool in proper position as it travels along a weatherstrip, performing the crimping function.

The tool is engaged about an in-place weatherstrip by powering the crimping rollers 92, 94 as they enter onto opposite sides of the strip, and the tool is then maneuvered to place the guide rollers 95, 96 against the face of the strip and hold them in that position as the powered rollers carry the tool along the strip while performing the crimping function. When a curve is encountered, the operator can merely exert pressure through the handle and housing to keep the tool tracking properly along the strip. The handle will swivel as this motion continues, so the operator does not need to twist his hands, wrists or arms to any extent to follow this motion entirely around an opening, or on any irregular path.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A weatherstrip forming tool comprising a main housing including a motor having an output shaft, said main housing having front and rear ends, a top and a bottom, and first and second sides, a first and second parallel drive shafts supported on said main housing and extending outward from said front end of said housing, means coupling said output shaft to said drive shafts to rotate said drive shafts in opposite directions, a set of crimping rollers, said rollers being attached-to each of said drive shafts defining a crimping nip between said rollers, a handle extending from said top of said main housing, said handle being located on a longitudinal axis extending at an angle inclined toward said rear end and outward of said first side of said main housing, a generally cylindrical grip rotatably supported on said handle to turn about said longitudinal axis whereby said main housing can rotate about said longitudinal axis as said crimping rollers follow a circuitous path along a weatherstrip.

2. A tool as defined in claim 1, further including a support block pivotally mounted to said main housing parallel to said drive shafts, said support block supporting said second drive shaft to allow limited separating movement of said drive shafts, and spring means fitted to said main housing and acting against said support block in a direction urging said second drive shaft toward said first drive shaft.

3. A tool as provided in claim 1, further including guide rollers supported at the front of said housing for free rotation, said guide rollers extending perpendicular to and above and below said crimping rollers.

4. A weatherstrip forming tool comprising a main housing including a motor having an output shaft, said main housing having front and rear ends, a top and a bottom, and first and second sides, a first and second parallel drive shafts supported on said main housing and extending outward from said front end of said housing, means coupling said output shaft to said drive shafts to rotate said drive shafts in opposite directions, a set of crimping rollers, said rollers being attached to each of said drive shafts defining a crimping nip between said rollers, a handle extending from said top of said main housing, said handle being located on a longitudinal axis extending at an angle inclined toward said rear end and outward of said first side of said main housing, a support block pivotally mounted to said main housing parallel to said drive shafts, said support block supporting said second drive shaft to allow limited separating movement of said drive shafts, and spring means fitted to said main housing and acting against said support block in a direction urging said second drive shaft toward said first drive shaft.

5. A tool as defined in claim 4, further including a generally cylindrical grip rotatably supported on said handle to turn about said longitudinal axis whereby said main housing can rotate about said longitudinal axis as said crimping rollers follow a circuitous path along a weatherstrip.

6. A tool as in claim 4, further including guide rollers supported at the front of said housing for free rotation, said guide rollers extending perpendicular to and above and below said crimping rollers.

* * * * *